United States Patent
Buckley et al.

(10) Patent No.: US 7,796,639 B2
(45) Date of Patent: *Sep. 14, 2010

(54) APPARATUSES AND METHODS FOR MULTI-ANTENNA CHANNEL QUALITY DATA ACQUISITION IN A BROADCAST/MULTICAST SERVICE NETWORK

(75) Inventors: Michael E. Buckley, Grayslake, IL (US); Brian K. Classon, Palatine, IL (US); Kenneth A. Stewart, Grayslake, IL (US)

(73) Assignee: Motorola Mobility, Inc., Libertyville, IL (US)

(*) Notice: Subject to any disclaimer, the term of this patent is extended or adjusted under 35 U.S.C. 154(b) by 422 days.

This patent is subject to a terminal disclaimer.

(21) Appl. No.: 11/689,492

(22) Filed: Mar. 21, 2007

(65) Prior Publication Data

US 2008/0232395 A1    Sep. 25, 2008

(51) Int. Cl.
*H04J 3/22* (2006.01)
(52) U.S. Cl. .................... 370/465; 370/208; 370/436; 370/473
(58) Field of Classification Search .................. None
See application file for complete search history.

(56) References Cited

U.S. PATENT DOCUMENTS

| | | | |
|---|---|---|---|
| 7,145,940 B2 | 12/2006 | Gore et al. | |
| 7,164,649 B2 | 1/2007 | Walton et al. | |
| 7,167,681 B2 | 1/2007 | Kuurne et al. | |
| 7,171,164 B2 | 1/2007 | Ylitalo | |
| 2003/0125025 A1* | 7/2003 | Lim | 455/435 |
| 2007/0104151 A1* | 5/2007 | Papasakellariou et al. | 370/335 |
| 2007/0248113 A1* | 10/2007 | Ko et al. | 370/436 |
| 2008/0032744 A1* | 2/2008 | Khan et al. | 455/562.1 |
| 2008/0267317 A1* | 10/2008 | Malladi | 375/299 |

FOREIGN PATENT DOCUMENTS

| | | |
|---|---|---|
| WO | 02082688 A | 10/2002 |
| WO | 2006102746 A | 10/2006 |

OTHER PUBLICATIONS

LG Electronics, "Multiplexing of MBMS and unicast transmission in E-UTRA downlink", 3GPP TSG-RAN WG1 Meeting Ad Hoc Lte., Jan. 1, 2006, pp. 1-5, vol. R1-060054.

EUTRA, "Downlink Pilot Requirements and Design" 3GPP 3rd Generation Partnership Project Technical Specification Group, Radio Access Network, Working Group, TSG-RAN WG1 #42, Aug. 29, 2005, pp. 1-13, vol. R1-050714.

(Continued)

*Primary Examiner*—Ricky Ngo
*Assistant Examiner*—Rasheed Gidado
(74) *Attorney, Agent, or Firm*—Hisashi D. Watanabe

(57) ABSTRACT

Various methods and apparatuses provide unicast channel data acquisition, such as antenna information, from MBMS subframes. A method of operating a wireless communications network infrastructure entity is disclosed comprising transmitting a subframe (300) comprising a unicast symbol (301) in a first predetermined symbol position within said subframe (300), said unicast symbol (301) comprising a first antenna reference information; defining said first antenna reference information as a second antenna reference information; and transmitting a second subframe comprising a second unicast symbol in a second predetermined symbol position within said second subframe, said second unicast symbol comprising said second antenna reference information.

10 Claims, 7 Drawing Sheets

OTHER PUBLICATIONS

Samsung, "Reference Signal Structure for 4-TX antenna MIMO", 3GPP TSG RAN WG1 Riga, Latvia, Nov. 6-10, 2006, pp. 1-8; vol. R1-063254.

Motorola, "Considerations on MBMS Resource Allocation", 3GPP TSG RAM WG2#57, Feb. 12 - Jan. 16, 2007, pp. 1-4, vol. R2-070755, St. Louis, USA.

* cited by examiner

First Unicast Sub-frame after MBSFN Sub-frame contains RS for antenna 3 or 3&4

First Unicast Sub-frame after MBSFN Sub-frame contains RS for antenna 3 or 3&4

= Unicast Sub-frame

= MBSFN Sub-frame

APPARATUSES AND METHODS FOR MULTI-ANTENNA CHANNEL QUALITY DATA ACQUISITION IN A BROADCAST/MULTICAST SERVICE NETWORK

FIELD OF THE DISCLOSURE

The present disclosure relates generally to communication networks providing Multimedia Broadcast Multicast Service (MBMS), and more particularly to methods and apparatuses for providing and receiving unicast channel information when MBMS is promulgated within a communication network coverage area.

BACKGROUND

Multimedia Broadcast Multicast Service (MBMS) is described in various standards such as the Third Generation Partnership Project (3GPP), Universal Mobile Telephone System (UMTS) standards. More recently, MBMS functionality has been specified in relation to orthogonal frequency division multiplexing (OFDM) physical layers, such as those exemplified by the IEEE 802.16e-2005 amendment or 3GPP Long Term Evolution (LTE) project (to which the term Evolved MBMS or EMBMS is sometimes applied). MBMS over OFDM and other selected physical layer structures (of which EMBMS is an example) enables a multicast approach referred to as multicast broadcast single frequency network (MBSFN). OFDM is particularly favorable for MBSFN operation when the OFDM symbols contain a cyclic prefix (CP) that can constructively recover multiple signal paths from one or more transmission sources. MBSFN techniques operate by simulcasting (i.e. transmitting on identical time-frequency network resources) from various cells (base transceiver stations or "enhanced node Bs", eNB's), over a given geographic area. Such areas may be defined by the radio coverage area of a group of base transceiver stations or even smaller areas as defined by antenna coverage sectors of the base transceiver station. Sometimes the term single frequency network area (SFA) is defined as the set of cells participating in the simulcasting procedure.

In addition to receiving MBMS service (where the generic term MBMS is understood to include 3GPP LTE-specific EMBMS), a mobile station, also referred to as "User Equipment" or "UE," may also engage in communication using dedicated channels or other via unicast signaling where the UE communicates with a specific base transceiver station.

Receiving unicast information by a UE is distinguishable from MBMS delivery reception, because the MBSFN is generally broadcast from one or more base transceiver stations (i.e. the SFA) such that a UE receives one composite desired signal from the base transceiver stations. Therefore, the individual base transceiver station transmissions are indistinguishable to the UE in the case of MBMS reception. Note that in the current context, while MBSFN transmission from multiple base stations is expected to be a typical operating mode, transmission from a single base station is specifically recognised as a practical case.

However a UE must have the ability to make measurements of individual base stations both for mobility and link adaptation purposes. In the 3rd Generation Partnership Project (3GPP) Long Term Evolution (LTE) core specifications base transceiver stations may be defined with up to 4 antenna ports. A set of associated reference symbols (RS, numbered RS 0, 1, 2, 3) may be defined and applied to Multiple Input, Multiple Output (MIMO) transmission of unicast downlink traffic. However, the UE is generally required to access only RS 0 and 1 for mobility measurement purposes, and may further need to access only RS 0 and 1 for reception of any unicast transmission from a specific cell delivered in coordinated fashion with the MBSFN transmission.

As specified by 3GPP, a downlink subframe formatted for MBMS transmission using the multicast broadcast single frequency network approach (MBSFN) over the Multicast Channel (MCH) is applied by time-division multiplexing (TDM) unicast and MBSFN subframes (note that here, the terms MCH and MBSFN subframe are used to indicate a subframe simulcast by one or most base stations). In at least one configuration, in any MBSFN subframe region associated with control data, only RS 0 and RS 1 will be present and transmitted in unicast mode by each base station, and any reference symbols transmitted over the MBSFN or MCH portion of the subframe may not be used as a phase reference for demodulating MIMO unicast transmissions or for demodulating any subsequent unicast subframe (i.e. a subframe dedicated to use by the so-called downlink shared channel (DL-SCH) in the case of 3GPP LTE). Nor may reference symbols transmitted over the MBSFN be used for other purposes related to the cell-specific unicast transmission, such as link adaption or MIMO transmission rank adaption.

Accordingly, given the adopted TDM approach to MBSFN structure in 3GPP LTE (and similar systems), and unicast allocated subframes, it would not be possible to maintain appropriate link adaptation metrics for all possible (up to 4) MIMO streams for a unicast subframe following a broadcast subframe due to the absence of RS 2 and 3 during a MBSFN-allocated (i.e. MCH-allocated) subframe.

Therefore, a means is required to enable observation of, and link adaptation in consideration of, the $3^{rd}$ and $4^{th}$ antennas (antennas numbered 2 and 3) while receiving MCH-allocated subframes or at least to minimize the impact of not observing antennas 2 and 3 while receiving MBSFN prior to re-commencement of non-MBSFN transmissions.

DETAILED DESCRIPTION

Methods and apparatuses for providing unicast information during promulgation of MBMS frames are provided herein.

As previously discussed, a mobile station ("user equipment" or "UE") must have the ability to make measurements of individual base stations, that is receive unicast information, both for mobility support and link adaptation. The present disclosure provides various solutions such that a UE may obtain such information while receiving MBMS data.

Figure 1:
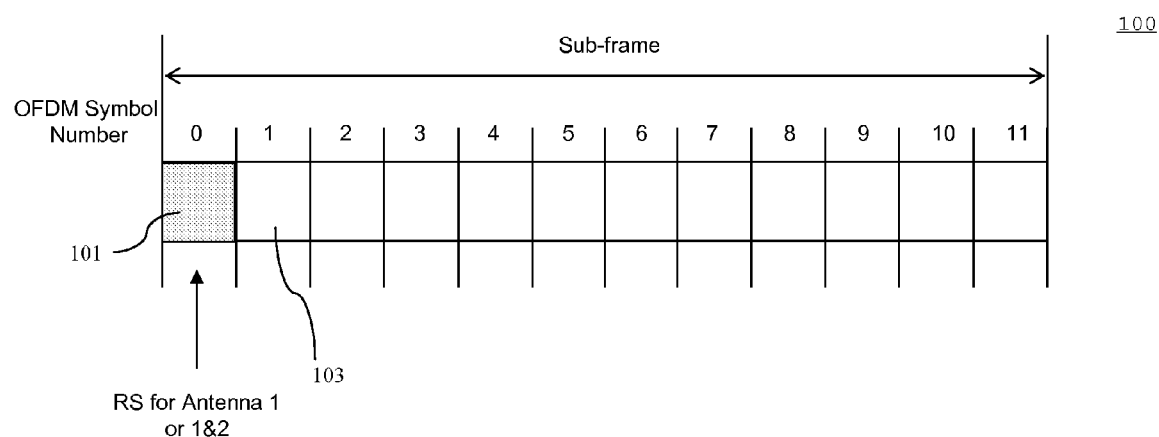
FIG. 1 is a block diagram illustrating an exemplary MBSFN OFDM subframe containing one unicast OFDM control symbol and eleven OFDM MBSFN or MCH-related symbols with the single OFDM control symbol containing reference symbols (RS) for antenna 1 and antenna 2.

Turning now to the drawings wherein like numerals represent like components, FIG. 1 illustrates an MBSFN subframe as defined by the 3GPP Radio Access Network (RAN) working group. In the MBSFN subframe 100 either the first OFDM symbol 101 (symbol number 0) or both the first OFDM symbol 101 and the second OFDM symbol 103 (symbol number 1) may contain unicast control information. More generally, a larger number of symbols could contain unicast control information.

As illustrated by FIG. 1, if only the first symbol 101 is required for sending the unicast control channel (referred to as the PDCCH in 3GPP LTE), then the first symbol 101 will not contain reference symbols (RS's) for any $3^{rd}$ and $4^{th}$ base transceiver station or "E-UTRAN NodeB" (eNB) antenna ports present. More particularly, $RS_2$ and $RS_3$ could not be transmitted using the RS locations defined in 3GPP TS 36.211, *3GPP Technical Specification for Physical Channels and Modulation*, Section 5.6.1.2, "Physical resource mapping" (March 2007) which is incorporated by reference herein.

Figure 2:
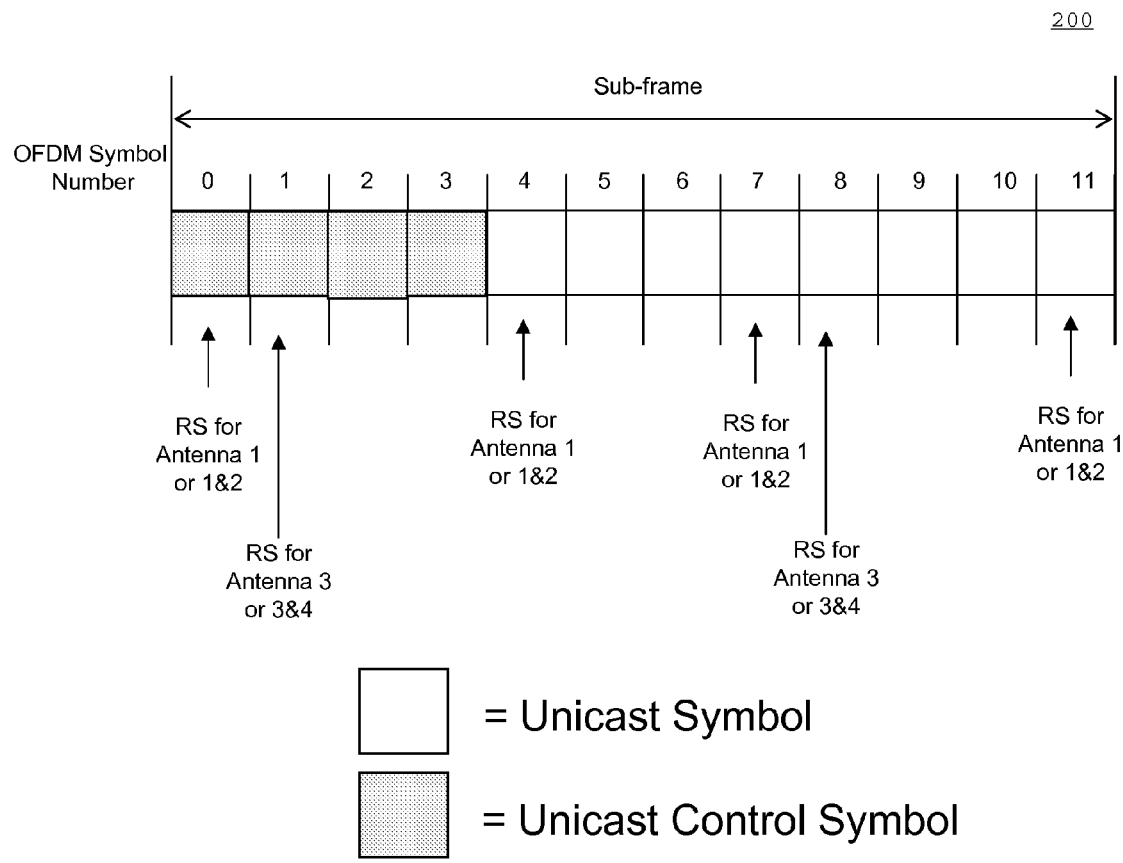
FIG. 2 is a diagram illustrating an exemplary OFDM unicast subframe wherein various symbols of the subframe may contain antenna information.

For example a UE should be able to make Channel Quality Indicator (CQI) measurements and, more generally, rank adaptation and pre-coding vector optimisation for the various antennas during MBSFN subframe transmission. In a purely unicast subframe, as illustrated by FIG. 2, the OFDM subframe 200 may provide reference symbols for the various antennas at various suitable symbol location numbers. Thus, some solution is needed to provide reference symbols and enable CQI measurements for all antennas during an MBSFN subframe.

Figure 3:
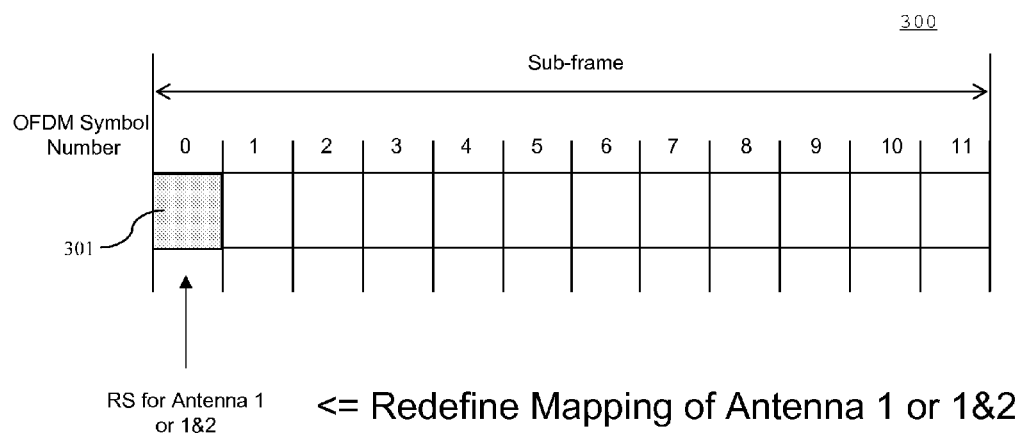
FIG. 3 is a block diagram illustrating an exemplary OFDM subframe having a single control symbol wherein the antenna information contained by the control symbol may be redefined on subsequent subframes.
Figure 3:
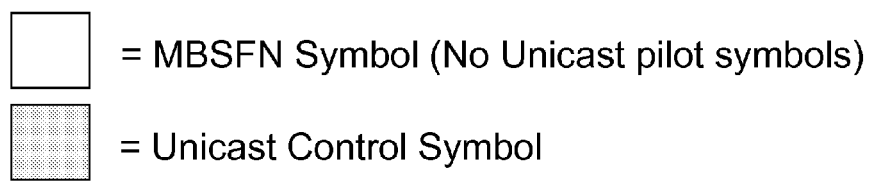

A first embodiment is illustrated by FIG. 3. In FIG. 3 an MBSFN subframe 300 contains only a single unicast symbol 301. Thus in the embodiment illustrated by FIG. 3, antenna rotation, or more generally re-mapping, is applied in subsequent MCH subframes. As illustrated in FIG. 3, the definition of antenna 0 (or 0 and 1) is re-mapped between all 4 antennas. This method is a non-invasive method to permit observation of all 4 eNB antennas.

Therefore, in sequence, MCH-allocated subframes (or group of subframes), antennas 0 through 3 are defined such that each antenna is designated as "antenna 1" for at least 1 transmission of the subframe, each antenna is designated as antenna 2 for other transmissions and so on. For example, if the eNB supports 4 antennas, the available eNB antennas are re-mapped in the unicast region, that is, the unicast symbol 301, of the MCH-allocated subframe 300 according to an a priori known re-mapping sequence. It is to be understood that the mapping may be onto 1 or 2 reference symbol locations depending upon the sub-frame configuration. Rotation or swapping may also be permitted (i.e. in antenna port order, 12, 23, 34, 41 or 12, 34, 12, 34, etc.) for the embodiment of FIG. 3. The embodiment of FIG. 3 can restrict a UE channel estimator to operate within an MBSFN subframe, but permits observation of all eNB antennas prior to re-commencement of unicast transmission.

If only the first OFDM symbol 301 is assigned for PDCCH purposes in MBSFN sub-frame 300, then TS 36.211 specifies RS locations for $RS_0$ and $RS_1$. These locations may include hopping or shifting of RS locations within a symbol from one cell to the next, or from one subframe to the next. Thus the first embodiment method for making available observations of antenna ports 3 and 4 is to rotate, or re-map, the association of an RS with antenna ports in each MBSFN-allocated subframe. For example, in subframe n, antenna ports 0 and 1 are respectively associated with $RS_0$ and $RS_1$, while in subframe n+1 antenna ports 2 and 3 are respectively associated with $RS_0$ and $RS_1$, and so on.

Figure 4:
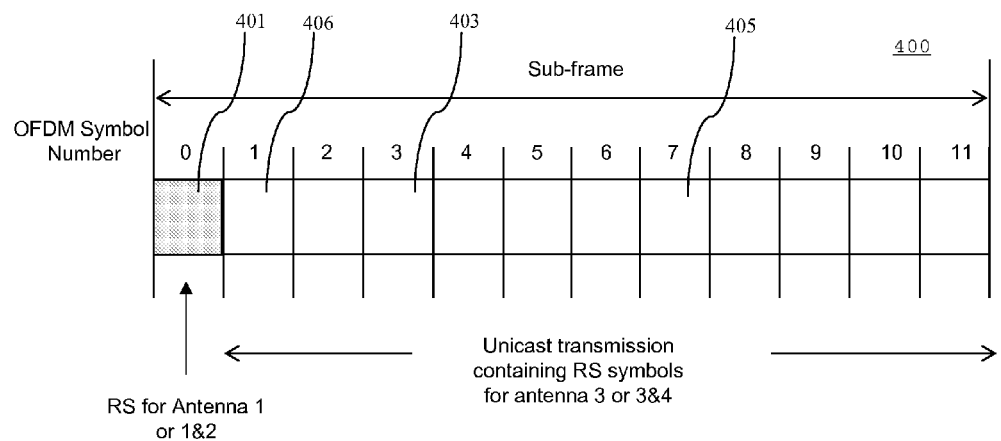
FIG. 4 is a block diagram illustrating an exemplary OFDM subframe having a first control symbol and wherein a second symbol carrying a unicast transmission is transmitted and which contains information for antenna 3 or antenna 3 and 4.
Figure 4:
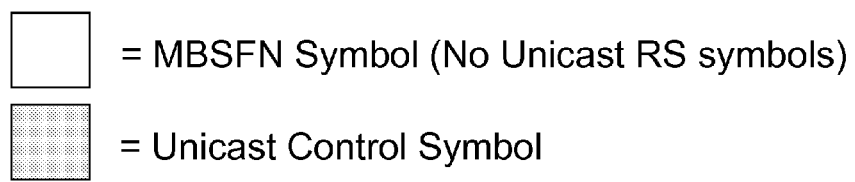

In a second embodiment, which is illustrated by FIG. 4, reference symbols for antennas 2 and 3, transmitted on a unicast basis by each base station participating in the MBSFN, are inserted into the MBSFN subframe in the position of an MCH or data or reference symbol.

In FIG. 4, a unicast control portion 401 contains reference symbols for antennas 0 and 1. The unicast portion 401 may be followed by a series of MCH or MBSFN allocated OFDM symbols (symbols numbered 1 through 11). At least one of the MBSFN allocated OFDM symbols, for example symbol number 3 403 or symbol number 7 405 or symbol number 1 406, will be replaced with a unicast OFDM symbol and will contain the additional unicast reference symbols for antennas 2 and 3.

More specifically, if only the first OFDM symbol 401 in an MBSFN subframe 400 were initially allocated for PDCCH transmission, and therefore only $RS_0$ and $RS_1$ were initially available for processing at the UE, an additional unicast symbol containing $RS_2$ or $RS_2$ and $RS_3$ would be transmitted in the remaining portion of the MBSFN subframe, that is, into one of symbol numbers 1 through 11, of the subframe 400. Note that while transmission of either $RS_2$ or $RS_2$ and $RS_3$ is possible, further restrictions on the number of permitted antenna ports might restrict optionality to only transmitting $RS_2$ and $RS_3$.

If a first OFDM symbol 401 and a second OFDM symbol in an MBSFN subframe were initially allocated for PDCCH transmission, only $RS_0$ and $RS_1$ may be made initially available for processing at the UE, even though locations for $RS_2$ and $RS_3$ are available. Reasons that only $RS_0$ and $RS_1$ may be initially made available include minimizing RS symbol overhead, or that the unicast control information itself does not gain a significant advantage from RS from e.g. 4 antennas. $RS_2$ and $RS_3$ may then be inserted into a MBSFN subframe that was initially configured for only $RS_0$ and $RS_1$.

Furthermore, $RS_2$ and $RS_3$ may be inserted into the first unicast OFDM symbol that contains $RS_0$ and $RS_1$, though the overhead if RS are spaced every 6 subcarriers would be quite high, with ⅔ of the symbol used for RS from 4 antennas.

In general, insertion may be accomplished via either replacing or puncturing. A multicast symbol may be replaced, or part of a multicast symbol may be punctured, with unicast RS information. A portion of the unicast symbol that is not initially used for RS from antennas 3 and 4 may be punctured.

Further in the various embodiments, the impact of such unicast RS replacement on the system may be minimized if MBSFN subframes are clustered together.

The method illustrated by FIG. 4 can limit loss of spectral efficiency in MBSFN or MCH-allocated subframes due to unnecessary RS provisioning until it is required, that is, until just before the recommencement of MIMO-enabled unicast transmissions. This approach is most efficient if MBSFN or MCH subframes are clustered in one group or several groups in a specific time interval (which may be referred to as a resource allocation interval or superframe). In some embodiments, the last subframe of the group of MBSFN or MCH associated subframes may have RS from all 4 antennas.

Thus one embodiment illustrated by FIG. 4, requires unicast transmission of at least a second OFDM symbol in an MBSFN subframe or sequence of MBSFN subframes before the first subframe containing a MIMO-enabled unicast transmission. Specifically all cells, that is, all eNB's, participating in the MBSFN would need to transmit at least two unicast control symbols in the specified MBSFN subframes.

In some embodiments delivering such PDCCH allocations may be embedded in the semi-statically configured MBSFN subframe sequence, and incorporated by a centralised entity, which could be referred to as the Multicast Coordination Entity (MCE), in transport block dimensioning for delivery over each single frequency area (SFA, the area covered by an MBSFN). Further in the various embodiments, the impact of the additional unicast control overhead on the system operation may be minimized if MBSFN subframes are clustered together.

The embodiments of FIG. 3 and FIG. 4 may have inefficiencies if a single stream transmit diversity technique such as cyclic delay diversity is employed for MBSFN or MCH subframe transmission but not for unicast transmission (e.g. in order to minimize RS overhead for MCH) or for the final MCH subframe before unicast transmission.

Figure 5:
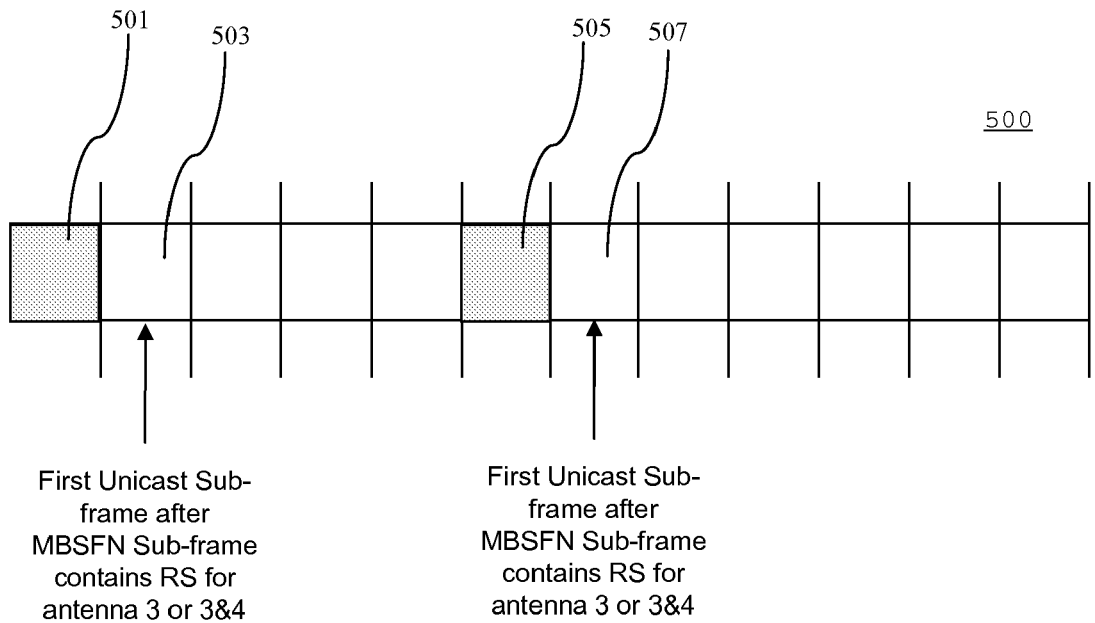
FIG. 5 is a block diagram illustrating an exemplary OFDM subframe wherein the first unicast subframe after an MBSFN subframe contains information for antenna 3 or antennas 3 and 4.
Figure 5:
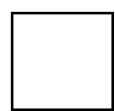
Figure 5:
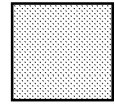

For such cases, FIG. 5 illustrates another embodiment in which reference symbols for at least the $3^{rd}$ and $4^{th}$ antenna are located in the first unicast subframe 503 after an MBSFN subframe 501. The first unicast subframe 503 of the subsequent unicast subframes are required to contain reference symbols for antennas not observable in MCH subframes.

The next, that is, the second unicast subframe may then commence with standard operation such as transmitting data. Because this method places a constraint on the system, the various embodiments may ease this constraint by grouping MCH subframes into one contiguous block. It is to be understood that a similar grouping approach may also be employed to enhance the embodiments described with respect to FIG. 3 and FIG. 4.

However, a disadvantage may occur in that if the contiguous MCH subframes form a long enough block, a gap in unicast traffic may become noticeable to the user (e.g. typically gaps of 100 ms or greater are noticeable for voice). Therefore an alternative embodiment may define bursts or clusters of MCH subframes which are of a maximum size in time.

Figures 6, 7:
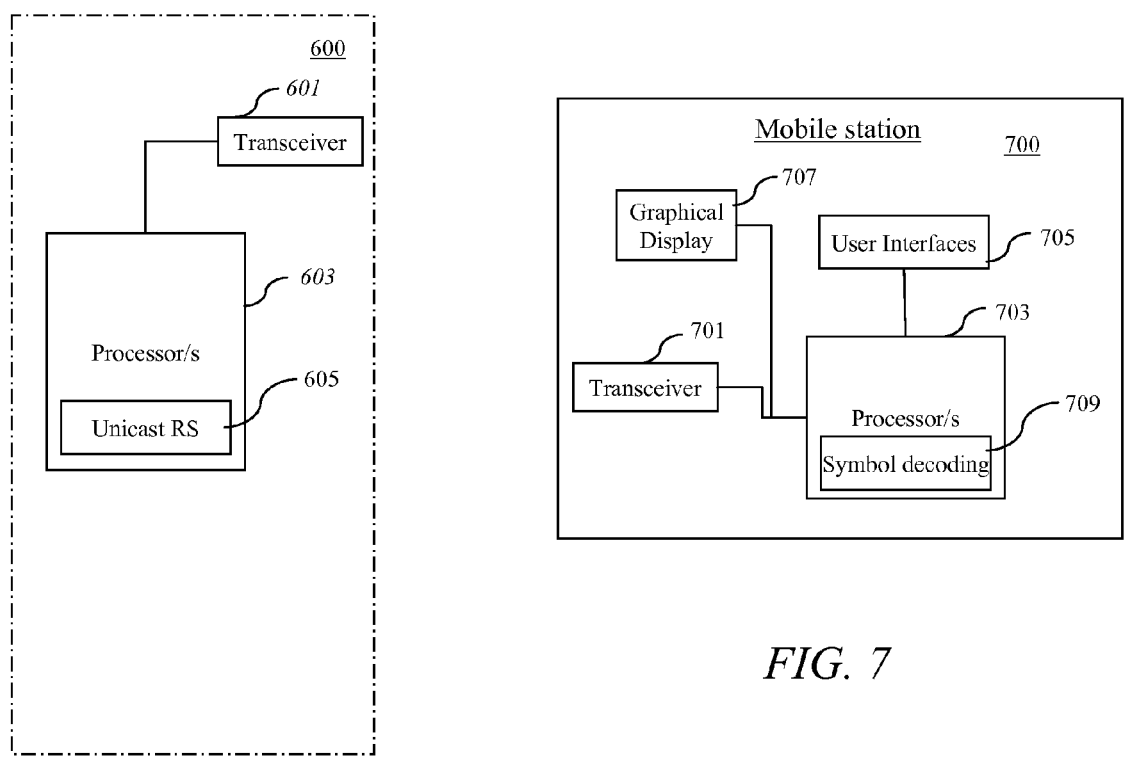
FIG. 6 is a block diagram of a base transceiver station or eNB in accordance with various embodiments.
FIG. 7 is a block diagram of a mobile station or user equipment (UE) in accordance with various embodiments.

FIG. 6 is a block diagram of a base transceiver station or eNB 600 in accordance with the various embodiments. A base transceiver station, or eNB may be alternatively referred to as a cell. The eNB 600 will comprise a transceiver or multiple transceivers 601 and comprises multiple antennas (not shown). The transceiver 601 is coupled to a processor or processors 603. In the various embodiments the processor/s 603 comprise a unicast reference symbol 605 module for including antenna reference symbols into unicast and multicast subframes in accordance with the various embodiments herein described.

It is to be understood that FIG. 6 is for illustrative purposes only and is for illustrating the module 605 in accordance with the present disclosure, and is not intended to be a complete schematic diagram of the various components and connections therebetween required for a base transceiver station/eNB. Therefore, an eNB will comprise various other components not shown in FIG. 6 and still be within the scope of the present disclosure.

FIG. 7 is a block diagram illustrating components of a mobile station in accordance with the various embodiments. Mobile station 700 comprises at least user interfaces 705, at least one processor 703, a graphical display 707 and one or more transceivers 701 capable of receiving signals from multiple antennas. The processor or processors 703 will also comprise a symbol decoding module 709 such that the mobile station may detect antenna reference symbols and make CQI measurements in accordance with the various embodiments described herein.

It is to be understood that FIG. 7 is for illustrative purposes only and is for illustrating the symbol decoding module 709 of a mobile station in accordance with the present disclosure, and is not intended to be a complete schematic diagram of the various components and connections therebetween required for a mobile station. Therefore, a mobile station will comprise various other components not shown in FIG. 7 and still be within the scope of the present disclosure.

Figure 8:
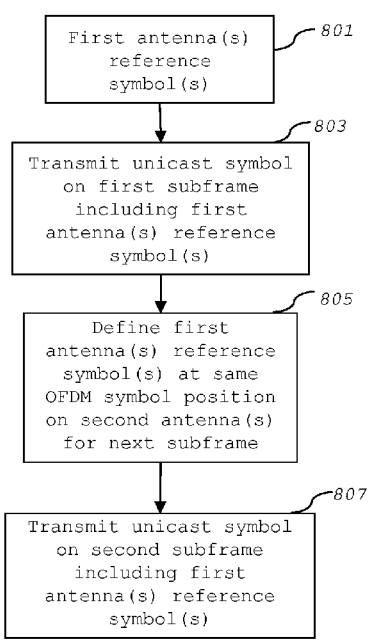
FIG. 8 is a flow chart illustrating a method of operation of an eNB in accordance with the embodiment illustrated in FIG. 3.

FIG. 8 is a flow chart illustrating a method of operation of an eNB in accordance with the embodiment illustrated in FIG. 3. In 801 reference symbols for a first antenna set, which may comprise one or more antennas, is defined by an eNB. In 803 a unicast symbol is transmitted on a first subframe including the reference symbols. In 805, the reference symbols of the first antenna may be redefined at the same OFDM symbol number position of the first subframe for a second antenna or set of antennas in a next subframe, or at any other suitable OFDM symbol number position. In 807 a unicast symbol in the second subframe includes the second antenna or second antenna set reference symbols. Note that the reference symbol may not be explicitly provided but rather in some embodiments, only the time-frequency location of the reference symbol, in other words, unicast antenna reference information, may be provided such that the reference symbol or symbols may be obtained by the UE.

Figure 9:
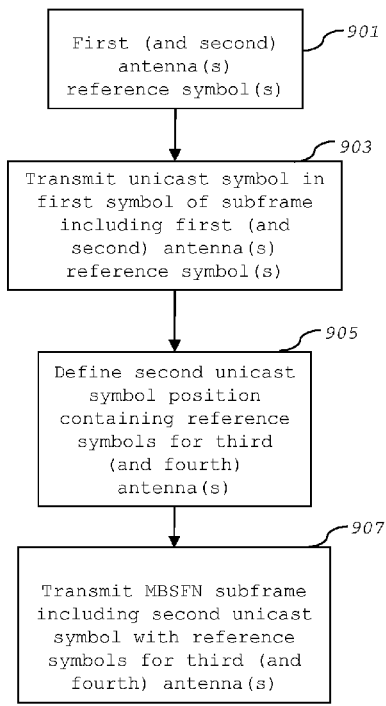
FIG. 9 is a flow chart illustrating a method of operation of an eNB in accordance with the embodiment illustrated in FIG. 4.

FIG. 9 illustrates a method of operation of an eNB corresponding to FIG. 4. Thus in 901 and 903 a unicast symbol is transmitted on a first subframe which includes reference symbols for a first antenna or first antenna set. In 905, a multicast symbol position is defined for transmitting a second unicast symbol containing a second antenna or second antenna set reference symbols. The second unicast symbol, which may be a control symbol, is transmitted in the MBSFN subframe in 907.

Figure 10:
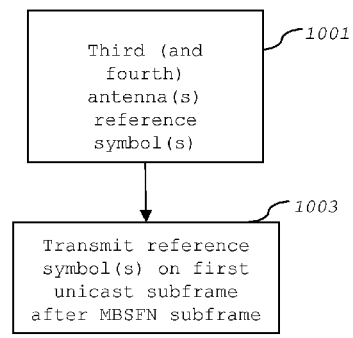
FIG. 10 is a flow chart illustrating a method of operation of an eNB in accordance with the embodiment illustrated in FIG. 5.

FIG. 10 illustrates a method of operation of an eNB in accordance with the embodiment illustrated in FIG. 5. Thus assuming a unicast subframe was transmitted after a given multicast subframe with antenna symbol information in 1001, reference symbol information will be again transmitted on the next unicast subframe following Thus various embodiments were disclosed for enabling measurements, such as CQI measurements, when a multi-antenna base transceiver station such as an eNB is configured to transmit a carrier frequency or frequency layer in a unicast/MBMS-mixed configuration.

While the preferred embodiments have been illustrated and described, it is to be understood that the disclosure is not so limited. Numerous modifications, changes, variations, substitutions and equivalents will occur to those skilled in the art without departing from the spirit and scope of the present invention as defined by the appended claims.

What is claimed is:

1. A method of operating a wireless communications network infrastructure entity comprising:
    transmitting a subframe comprising a unicast symbol in a first predetermined symbol position within said subframe, said unicast symbol comprising a first antenna reference information;
    defining said first antenna reference information as a second antenna reference information; and
    transmitting a second subframe comprising a second unicast symbol in a second predetermined symbol position within said second subframe, said second unicast symbol comprising said second antenna reference information, wherein said second predetermined symbol position is identical to said first predetermined symbol position.

2. The method of claim 1, wherein at least one of said first antenna reference information or said second antenna reference information is a unicast antenna reference symbol.

3. The method of claim 1, wherein the step of transmitting a subframe further comprises:
    transmitting a mixed configuration subframe, said subframe comprising at least one unicast symbol and a plurality of multicast symbols.

4. The method of claim 3, further comprising:
    transmitting a multicast broadcast single frequency network (MBSFN) subframe, said subframe comprising a plurality of orthogonal frequency division multiplexed (OFDM) symbols.

5. A base station comprising:
    at least three transmit antennas;
    a transceiver coupled to said at least three transmit antennas; and
    at least one processor coupled to said transceiver, said transceiver and said processor configured to:
    transmit a subframe comprising a unicast symbol in a first predetermined symbol position within said subframe, said unicast symbol comprising a first antenna reference information;
    define said first antenna reference information as a second antenna reference information; and
    transmit a second subframe comprising a second unicast symbol in a second predetermined symbol position within said second subframe, said second unicast symbol comprising said second antenna reference information, wherein said second predetermined symbol position is identical to said first predetermined symbol position.

6. The base station of claim 5, wherein said transceiver and said processor are further configured to:
    transmit a mixed configuration subframe, said subframe comprising at least one unicast symbol and a plurality of multicast symbols.

7. The base station of claim 6, wherein said transceiver and said processor are further configured to:
    transmit a multicast broadcast single frequency network (MBSFN) subframe, said subframe comprising a plurality of orthogonal frequency division multiplexed (OFDM) symbols.

8. A mobile station comprising:
    a transceiver; and
    at least one processor coupled to said transceiver, said transceiver and said processor configured to:
    receive a subframe comprising a unicast symbol in a first predetermined symbol position within said subframe, said unicast symbol comprising a first antenna reference information; and
    receive a second subframe comprising a second unicast symbol in a second predetermined symbol position within said second subframe, said second unicast symbol comprising said second antenna reference information, wherein said second predetermined symbol position is identical to said first predetermined symbol position.

9. The mobile station of claim 8, wherein said transceiver and said processor are further configured to:
    receive a mixed configuration subframe, said subframe comprising at least one unicast symbol and a plurality of multicast symbols.

10. The mobile station of claim 9, wherein said transceiver and said processor are further configured to:
    receive a multicast broadcast single frequency network (MBSFN) subframe, said subframe comprising a plurality of orthogonal frequency division multiplexed (OFDM) symbols.

* * * * *